(12) United States Patent
Arad (10) Patent No.: US 7,573,947 B2
(45) Date of Patent: Aug. 11, 2009

(54) SIMPLIFIED NARROWBAND EXCISION

(75) Inventor: Oren Arad, Palo Alto, CA (US)

(73) Assignee: Terayon Communication Systems, Inc., Santa Clara, CA (US)

( * ) Notice: Subject to any disclaimer, the term of this patent is extended or adjusted under 35 U.S.C. 154(b) by 576 days.

(21) Appl. No.: 10/892,631

(22) Filed: Jul. 15, 2004

(65) Prior Publication Data

US 2006/0029142 A1 Feb. 9, 2006

(51) Int. Cl.
*H04K 1/10* (2006.01)
(52) U.S. Cl. .................. 375/295; 375/296; 375/222
(58) Field of Classification Search .............. 375/260, 375/346, 222, 227, 148, 350; 348/607; 725/105, 725/111, 125; 455/307, 296, 278.1; 708/300; 381/94.3, 71.11, 93, 316, 317; 704/225
See application file for complete search history.

(56) References Cited

U.S. PATENT DOCUMENTS

| | | | | |
|---|---|---|---|---|
| 5,706,394 A * | 1/1998 | Wynn | ........................ | 704/219 |
| 5,838,268 A | 11/1998 | Frenkel | ...................... | 341/111 |
| 6,088,668 A * | 7/2000 | Zack | .......................... | 704/225 |
| 6,112,086 A | 8/2000 | Wala | ........................... | 455/434 |
| 6,115,409 A | 9/2000 | Upadhyay et al. | ........... | 375/144 |
| 6,236,731 B1 * | 5/2001 | Brennan et al. | ............. | 381/316 |
| 6,426,983 B1 | 7/2002 | Rakib et al. | .................. | 375/346 |
| 6,654,431 B1 | 11/2003 | Barton et al. | ............... | 375/346 |
| 6,791,995 B1 | 9/2004 | Azenkot et al. | ............. | 370/436 |
| 6,826,242 B2 * | 11/2004 | Ojard et al. | .................. | 375/350 |
| 6,975,673 B1 * | 12/2005 | Rouquette | ................... | 375/149 |
| 7,058,141 B1 * | 6/2006 | Nedic | .......................... | 375/341 |
| 7,058,572 B1 * | 6/2006 | Nemer | ....................... | 704/226 |
| 7,209,567 B1 * | 4/2007 | Kozel et al. | ................ | 381/94.3 |
| 2003/0072392 A1 * | 4/2003 | Beadle et al. | ................ | 375/316 |
| 2005/0169395 A1 * | 8/2005 | Monta | ......................... | 375/261 |

OTHER PUBLICATIONS

International Searching Authority, Search Report, PCT/US05/25302 (Mar. 14, 2006).

* cited by examiner

*Primary Examiner*—Chieh M Fan
*Assistant Examiner*—Aristocratis Fotakis
(74) *Attorney, Agent, or Firm*—Larry T. Cullen (57) ABSTRACT

An improved ingress cancellation filter comprising a Fast Fourier Transform circuit which replaces the analysis filter bank of the prior art to break the incoming signal down into sub bands, an ingress cancellation filter that weights each sub band based upon the probability that the sub band is corrupted by noise, and an inverse Fast Fourier Transform circuit to put the weighted sub bands back together into an output signal and replacing the synthesis filter bank of the prior art. Also, an improved predictor filter which can be used with CDMA circuitry by initializing the predictor filter at the beginning of each spreading interval using the samples received on the first L unused codes of the spreading interval.

8 Claims, 7 Drawing Sheets

SIMPLIFIED NARROWBAND EXCISION

BACKGROUND OF THE INVENTION

In the field of code division multiplexed data transmission systems such as is used in digital data transmission over hybrid fiber coaxial (HFC) cable systems and DOCSIS compatible data delivery systems in particular, there is a problem of narrow band interference. This problem is particularly found on the upstream transmissions in DOCSIS and other such non DOCSIS digital data delivery systems which deliver data over HFC (hereafter collectively referred to as DOCSIS systems). Because the upstream in a DOCSIS system is a noisy environment, there is a need to provide ingress cancellation systems at the head end of such DOCSIS systems to find and cancel or suppress narrowband interference.

One such prior art system is taught in U.S. Pat. No. 6,426,983 assigned to Terayon Communication Sytems, Inc. This patent teaches use of banks of near perfect analysis and reconstruction filters to break the spectrum into more narrow bands which are then analyzed individually for the presence of narrowband interference signals. Any band which is found to have narrowband interference present has its samples suppressed during the reconstruction. More precisely, the input signal is divided into a plurality of narrow frequency sub-bands using an analysis filter bank. Then the power in each sub band is monitored and compared to an adjustable or adaptive threshold in order to discriminate normal signal from narrowband interference. The signals that exceed the power threshold at the output of the sub bands are eliminated by replacing their sample values with zeroes). As the interference becomes lower and lower in power relative to the signal, completely eliminating the samples throws away a large amount of useful signal just to get rid of a small amount of interference. It would be better to weight each sub band based upon the amount of interferference in a sub band. Finally, the outputs of all sub bands are reassembled into the full band signal using a synthesis filter bank.

In the prior art U.S. Pat. No. 6,426,983, the analysis filters and the synthesis filters are implemented as FIR filter banks. More efficient narrowband interference cancellation requires that many narrow sub bands be used. This requires more FIR filters for the analysis and synthesis filter banks which drives the costs up. A more efficient implementation for the analysis and synthesis filter banks is needed. U.S. Pat. No. 5,838,268 teaches the use of Fast Fourier Transform circuitry to generate a plurality of separate carrier signals in a discrete multitone transmitter and inverse Fast Fourier Transform circuitry to receive the transmitted signal in the receiver.

FIG. 13 through FIG. 15 of the prior art U.S. Pat. No. 6,426,983 teach a predictor block circuit. This circuit is an adaptive FIR filter which functions to reduce any residual narrowband interference after the ICF block (ingress cancellation filter). The predictor block uses symbol decisions from the slicer to remove correlated (colored) noise in the slicer input. The predictor in code division multiple access (CDMA) systems operates after the despreader (in the code domain).

There is a need for a more efficient method of implementing the analysis and synthesis filter bank. There is also a need to improve the performance of the ingress cancellation filter by using optimal sub band weighting instead of censoring (setting all sample values in a sub band corrupted by narrowband interference to zero). There is also a need for a robust method for predictor functionality in CDMA systems.

SUMMARY OF THE INVENTION

The first improvement over the prior art is to weight sub bands in accordance with the amount of interference in the sub band. As the ratio of the noise power of narrowband interfence to the power of the payload signal itself gets closer to one, the weights of the sub band samples are set closer to one. The optimal way to calculate weights is through use of a Weiner filter and equation (3) given in the detailed description of the invention.

All species within the genus of the invention will use weights for sub band samples as opposed to censoring where samples in sub bands which are deemed to be corrupted by noise have their weights set to zero by multiplying the samples by 0. Any way of calculating the weights will suffice, but the Weiner filter is best. All species within the genus will calculate weights of sub bands based upon the difference or ratio between noise power (or amplitude squared or just plain amplitude of the noise signal) and the signal power (or amplitude squared or just plain amplitude of the signal). All species within the genus of the invention will multiply the weight calculated for each band times the samples for that band or the analog signal level of each band.

A simplified implementation of an analysis filter bank and a synthesis filter bank is also disclosed.

DETAILED DESCRIPTION

Figure 1:
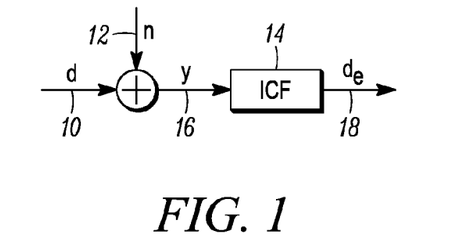
FIG. 1 is a simplified conceptual model of the upstream with an ingress cancellation filter present.

FIG. 1 is a simplified conceptual model of the upstream with an ingress cancellation filter present. Vector 10, d, represents the upstream transmitted signal from the cable modem or other source. Vector 12, n, represents the additive noise as the signal propagates upstream and includes additive white guaussian noise as well as narrowband interference.

The combined transmitted signal d plus the additive noise which is input to the ingress cancellation filter 14 is represented by vector 16.

The function of the ingress cancellation filter is to remove or suppress the noise and output only the payload signal as vector 18, $d_e$. One difference of ICF filter 14 over the prior art represented by U.S. Pat. No. 6,426,983 is that if a sub band is found to be corrupted by noise, the samples of that sub band are not censored (multiplied by zero), but are weighted by some weighting factor whose value depends upon the ratio of the noise power to the signal power.

Formalizing the problem, we are interested in finding the optimal set of weights to produce the best estimation of $d_e$ from y, under the minimum mean square error criterion (MVSE).

The well known optimal MVSE solution is the Wiener filter, which has the following formula:

$$H(e^{jw}) = \frac{S_{dy}(e^{jw})}{S_{yy}(e^{jw})} \quad (1)$$

where $S_{dy}$ is the Fourier transform of the cross correlation between d and y, and $S_{yy}$ is the Fourier transform of the autocorrelation of y (the spectral density of y).

Assuming that d and n are not correlated, the Wiener filter takes the form:

$$H(e^{jw}) = \frac{S_{dd}(e^{jw})}{S_{dd}(e^{jw}) + S_m(e^{jw})} \quad (2)$$

where $S_{dd}$ is the Fourier transform of the autocorrelation of d (the spectral density of d). $S_{nn}$ is the Fourier transform of the autocorrelation of n (the spectral density of n).

To drive the optimal solution for the proposed system, it is first assumed that the sub bands are narrow enough, such that the spectrum of the signal and the noise in each sub band is white, i.e., flat spectral density. The spectral power density of $S_{dd}$ and $S_{nn}$ at any analysis filter sub band becomes a constant, and equal to the average power of $S_{dd}$ and $S_{nn}$ at this sub band.

Equation (2) will take the following form, which provides the solution for optimal weighting W(k) for each sub band k:

$$W(k) = \frac{S_{dd}(k)}{S_{dd}(k) + S_{nn}(k)} \quad (3)$$

where $S_{dd}(k)$ is the signal average power in the $k^{th}$ sub band and $S_{nn}(k)$ is the noise average power in the $k^{th}$ sub band for k=1, 2, ... N.

Figure 2:
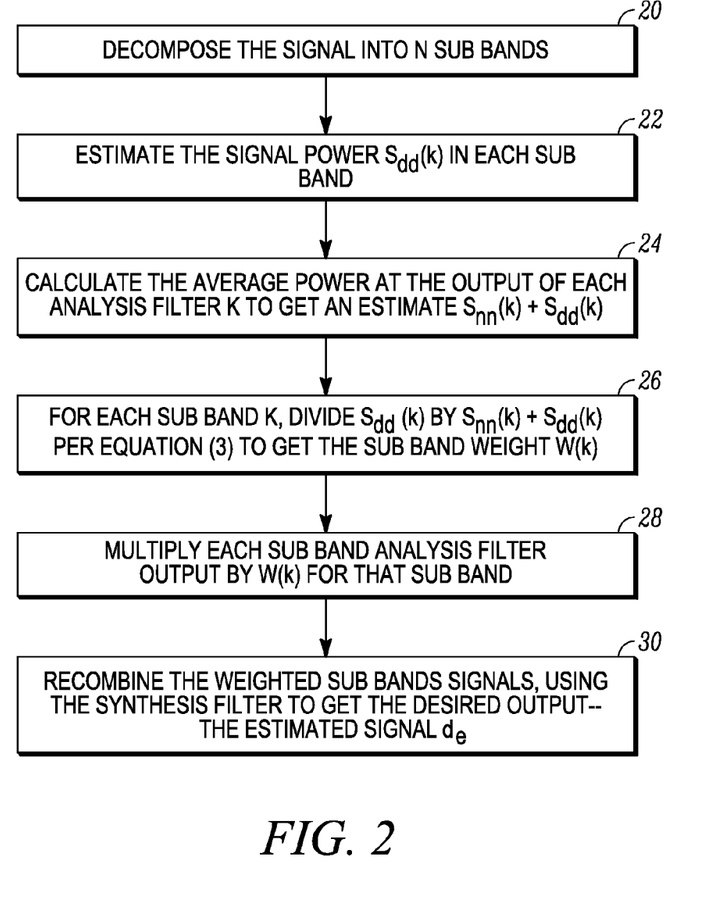
FIG. 2 is a flowchart of the process the ingress cancellation filter carries out.
Figure 10:
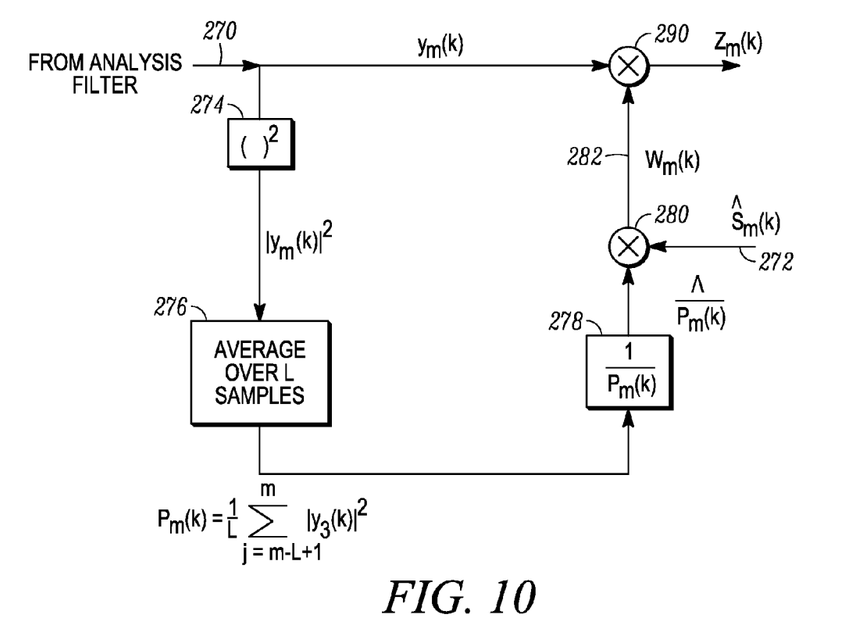
FIG. 10 is a circuit for calculating the weights for each sub band and weighting the samples for each sub band

Therefore, the ingress cancellation filter system 14 in FIG. 1 operates according to the flowchart of FIG. 2. A circuit for calculating the weights for each sub band and weighting the samples for each sub band is shown in FIG. 10 and this circuit will be discussed simultaneously with the discussion of the process of FIG. 2 which it implements. Preferably, the process is employed to weight the samples in sub bands for upstream transmissions from a plurality of distributed cable modems over a hybrid fiber coaxial cable system to a cable modem termination system, but the same methodology can be used to do narrow band excision on other types of signals such as cell phone transmissions.

The process of FIG. 2 can be carried out by any digital or analog circuit capable of carrying out the functions detailed in FIG. 2, and one example is shown in FIG. 10. In the preferred embodiment, the process of FIG. 2 is carried out digitally using digital filters for the banks of analysis and synthesis or reconstruction filters known from the prior art and using digital multiplication on the samples output by each analysis filter.

In step 20, a bank of analysis filters (or a microprocessor programmed to do a Fast Fourier Transform on the input signal) decomposes the input signal y into N sub bands. The samples from each sub band enter the circuit of FIG. 10 on line 270. In step 22, the signal power $S_{dd}(k)$ which is transmitted in each sub band is estimated. This can be done in DOCSIS systems using power level control data transmitted from the cable modem termination system (CMTS) to the particular cable modem (CM) whose signal is being processed. In DOCSIS systems, the CMTS carries out a training process with each CM which involves measurement and adjustment of power of transmissions from each CM such that transmissions from that CM arrive at said CMTS at a nominal or desired power level. The downstream messages to each CM tell it by how much to adjust its power of transmission to achieve this end. The CMTS controls the power of transmission by each CM, so this data is used in the circuit of FIG. 10 to develop an estimate of $S_{dd}(k)$ for sub band k at time index m, said estimate being supplied from the CMTS microprocessor or other circuitry controlling MAC layer processing on line 272.

In step 24 of FIG. 2, the average power at the output of each analysis filter k is calculated to an estimate of $S_{nn}(k)+S_{dd}(k)$. This is also true if an FFT calculation is used to break the received signal up into sub bands. Recall that $S_{dd}(k)$ is the power spectral density of the transmitted signal before it gets corrupted with ingress noise in the $k^{th}$ sub band.

Also, recall that $S_{nn}(k)$ is the power spectral density of the noise component in the $k^{th}$ sub band. In FIG. 10, an estimate of the power in each sub band is calculated by circuits 274 and 276. Circuit 274 calculates the power in each sample by multiplying each sample (a complex number) times its conjugate. The result for each sample is input to an averaging circuit 276 which does a moving average calculation using a sliding window which is L samples wide. The calculation circuit 276 performs is specified by the following equation:

$$P_m(k) = \frac{1}{L} \sum_{j=m-L+1}^{m} \text{abs}[y_j(k)]^2$$

This calculation updates the average power of the received signal in each sub band each time a new sample in this sub band is received. There is one of these circuits of FIG. 10 for each sub band in the preferred embodiment, but in other embodiments, one circuit is used to calculate the weight of each sub band and weight the samples in a round robin multiplexed way. Circuit 278 calculates the inverse of the average power $(1/P_m(k)=1/[S_{nn}(k)+S_{dd}(k)])$ so that the calculation of step 26 in FIG. 2 can be made by a simple multiplication carried out in multiplier 280. The result on line 282 is the weighting factor for sub band k. This weighting factor is used to multiply each sample in multiplier 290. The resulting weighted samples on line 292 are applied to the bank of synthesis filters or the inverse FFT operation.

For each sub band k, step 26 divides $S_{dd}(k)$ by $S_{nn}(k)+S_{dd}(k)$ per equation (3) to derive the sub band weight W(k) for each sub band (circuits 278 and 280 in FIG. 10). The signal reconstruction process starts with step 28. There, the output of each sub band analysis filter is multiplied by the appropriate weighting factor W(k) for that sub band (circuit 290 in FIG. 10). This causes any sub band signal that is corrupted by significant amounts of noise relative to the signal power to be weighted less than the signals from other bands which are not corrupted by noise. In step 30, the weighted sub band signals are recombined using the synthesis filter or filter bank to get the desired output which is the estimated signal $d_e$.

In many digital data communications systems, the transmitted signal power spectral density $S_{dd}(k)$ for each sub band is known in advance. For example, in DOCSIS systems, the cable modem termination system (CMTS or head end receiver) manages the power transmitted by each cable modem via downstream messages during the training process. These messages tell the cable modem whether to increase or decrease its transmitted power level so as to result in reception at a nominal power level at the CMTS. In such systems, $S_{dd}(k)$ can be derived for each sub band by scaling the total power by the factor corresponding to the spectral power of the transmit filter in the $k^{th}$ sub band.

In other systems where the head end receiver does not control the transmitted power, the signal power $S_{dd}(k)$ can be estimated from the gain control loops, which are part of the head end receiver.

Figure 3:
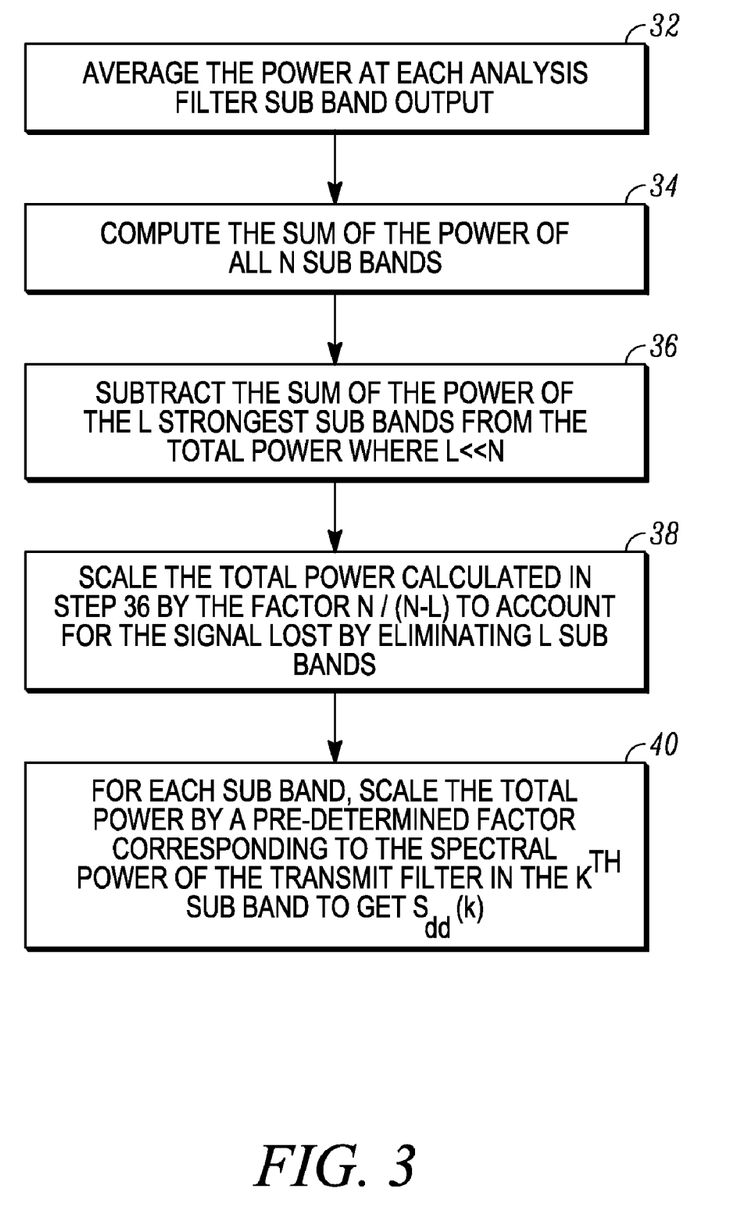
FIG. 3 is a flowchart of a process to estimate the value of $S_{dd}$.

A method of estimating the signal power $S_{dd}$ from the ICF itself is as shown in the flowchart of FIG. 3. The method starts at block 32 with the step of averaging the power at each analysis filter sub band output. In step 34, the sum of the power of all N sub bands is computed. In step 36, the power of the L strongest sub bands is subtracted from the total power calculated in step 34. L is much less than N. In step 38, the new total power calculated in step 36 is scaled by the factor N/N−L to account for the signal lost by eliminating the L strongest sub bands. Finally, in step 40, the power of the signal $S_{dd}$ in each sub band is calculated by scaling the total power by a predetermined factor corresponding to the spectral power of the transmit filter in the $k^{th}$ sub band to derive $S_{dd}(k)$.

The power estimation process can be a continuous operation, allowing $S_{dd}$ to adaptively track variation in the received power.

The system of the invention provides the optimal values for single weight per sub band implementation. However, if the spectrum in the sub band is not flat, the optimal solution requires a filtering operation in each sub band rather than multiplying with a single weight. Such an implementation is very costly, and the results in only a small improvement compared with a single weight multiplication. The system designer can avoid the complications of filtering each sub band by narrowing each sub band by increasing the number of analysis filters in the analysis filter bank so as to achieve a flat spectrum, or to work with a sub optimal solution using a single weight on a wider sub band.

The following table shows simulation results for signal-to-noise ration (SNR) after noise corrupted signal is processed by the ICF filtering process, comparing results using optimal weighting per the teachings of the invention versus censoring (weight=0 for sub bands where narrowband interference is found). This table shows that as the noise power of the narrowband interference gets less (weight of the noise corrupted sub band getting closer to one), the system of the invention begins to outperform the prior art censoring system. For example, where the weight is 0.38 for a sub band, the system according to the teachings of the invention outputs a signal with 23.3 dB signal to noise ratio as opposed to only 21.9 dB with a prior art censoring system.

| C/I | Weight | ICF output SNR with optimized weight | ICF output SNR with weight = 0 (prior art censoring) |
|---|---|---|---|
| 10 dB | 0.07 | 22.0 dB | 21.9 dB |
| 11 dB | 0.09 | 22.1 dB | 21.9 dB |
| 12 dB | 0.11 | 22.1 dB | 21.9 dB |
| 13 dB | 0.13 | 22.2 dB | 21.9 dB |
| 14 dB | 0.16 | 22.3 d/B | 21.9 dB |
| 15 dB | 0.2 | 22.5 dB | 21.9 dB |
| 16 dB | 0.23 | 22.6 dB | 21.9 dB |
| 17 dB | 0.28 | 22.8 dB | 21.9 dB |
| 18 dB | 0.33 | 23.0 dB | 21.9 dB |
| 19 dB | 0.38 | 23.3 dB | 21.9 dB |

Efficient Implementation of the Filter Banks

Like the prior art, the ICF filter 14 in FIG. 1 uses, in one embodiment, a bank of analysis filters to break the incoming signal down into sub bands and a bank of synthesis filters to recombine the sub band signals after they have been processed to suppress sub band signals which may be corrupted by noise.

There follows a discussion of a more efficient way to implement the analysis and synthesis filter banks. The following block parameters are used:

N=the number of sub bands that the signal is broken into;
M=a decimation factor for the processing rate of the data samples at each sub band branch;
L_ana=the number of taps (coefficients) of the filter at each sub band of the analysis filter;
L_syn=the number of taps (coefficients) of the filter at each sub band of the synthesis filter.

Analysis Filter Bank

The implementation of the analysis filter bank can be represented as a filtering operation followed by a Fast Fourier Transform operation. Prior art analysis filter banks such as those taught in U.S. Pat. No. 6,426,983 required the use of multiple FIR filters (one for each sub band) and required memory to store the coefficients for each filter. Further, there was much multiplication in each FIR filter of coefficients times sample values.

Figure 4:
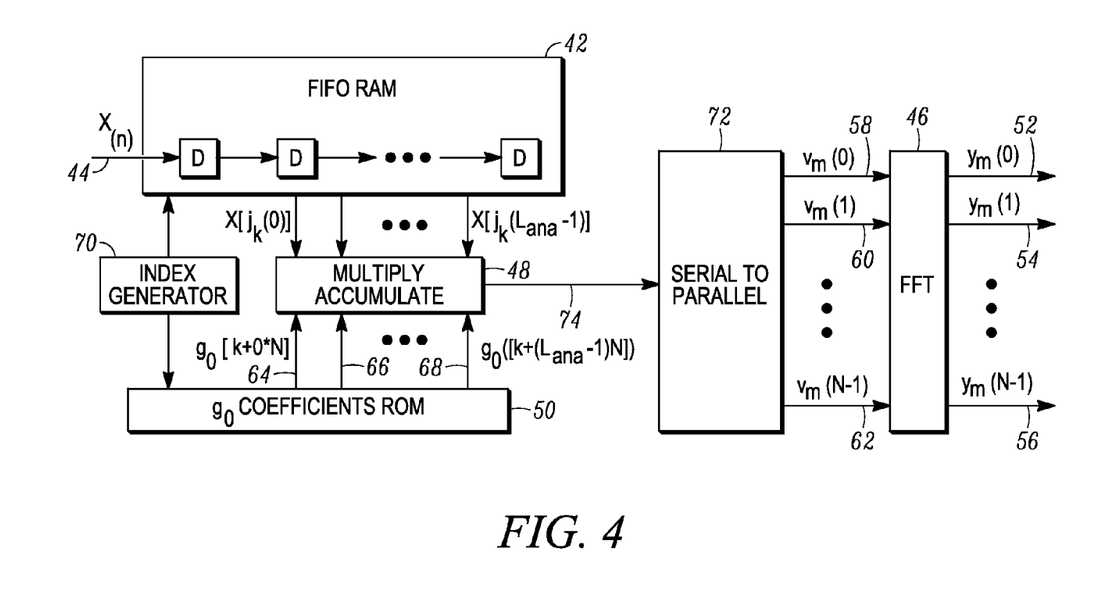
FIG. 4 is a block diagram showing a more efficient implementation of a filter bank for the analysis filters which break the incoming signal into sub bands.

FIG. 4 is a block diagram showing the more efficient implementation. The basic analysis filter bank is comprised of an FFT calculation circuit 46 preceded by an FIR filter operation comprised of FIFO 42, a multiply accumulate circuit 48 and a coefficients ROM 50. The FFT calculation circuit 46 takes input sample vectors and outputs a string of complex numbers on each of lines 52, 54 and 56. Each line 52, 54 and 56 carries the complex numbers that represent the amplitude and frequency of multiple Fourier frequency components that define the frequency spectrum of each sub band. The FIR filter imposes a pulse shape on the input samples $V_m(0), V_m(1) \ldots V_m(N-1)$ input to the FFT calculation circuit 46 on lines 58, 60 and 62. Use of a single FFT calculation circuit eliminates the need for multiple FIR filters, one for each sub band. The FIR filter that imposes the pulse shape also saves ROM space by storing fewer coefficients since the pulse shape that is imposed on the input samples is the same for each subband. That pulse shape is defined by the coefficients $g_0[k+0*N]$ through $g_0[k+(L_{ana}-1)N]$ output on lines 64, 66 and 68. Imposing a pulse shape on the input samples to the FFT modifies the square pulse shape per sub band which would otherwise result without the use of the FIR filter.

A FIFO buffer 42 with a memory length N*L_ana complex numbers is pushing in the current input sample x[n] on line 44 to the head of the FIFO (index 0 in FIFO 42) and throwing out the sample s[n−N*L_ana] from the bottom of the FIFO (index N*L_ana−1 in FIFO 42].

A single coefficient bank $g_0$ of length N*L_ana holds the coefficient values of the first sub band (the DC sub band).

An FIR filter operation outputs samples $V_m$[k] according to the following formula:

$$V_m[k] \sum_{i=0}^{L\_ana-1} g_0(k+iN) * Xfifo[(m*M + i*N + k) \bmod N] \quad (4)$$

where k is the sub band index k=0, 1, ..., N−1
m counts continuous FFT intervals m=0, 1, ...
modN is the modulo by N function.

The sequential FIR output $V_m$[k] is assembled into an N length vector $V_m = \{v_m(0), v_m(1), \ldots, v_m(N-1)\}$. $V_m$ is the mth input to the N point FFT calculation circuit 46. The FFT calculation circuit 46 outputs an N length vector $Y_m$. The N elements of $Y_m$ are the desired N sub band outputs of the analysis filter which corresponds to signal 61 in FIG. 5 of the prior art U.S. Pat. No. 6,426,983.

The FIFO RAM 42 is of length N*L_ana. The coefficient ROM is of length N*L_ana. Using coefficient symmetry, the ROM can be reduced to size N/2*L_ana. An index generator 70 produces the index for the FIFO Xfifo 42. The index generator also produces the index for the coefficient bank 50 according to equation (4). Multiply and accumulate unit 48 performs the multiplication operation defined in equation (4). A serial to parallel converter 72 converts the serial stream of FIR filter multiplication results on line 74 output by multiply and accumulate circuit 48 to a parallel format vector of length N for input to the FFT calculation circuit. The FFT calculation circuit performs the Fast Fourier Transform operation on the input data to generate the sub band spectra on lines 52, 54, etc.

Figure 5:
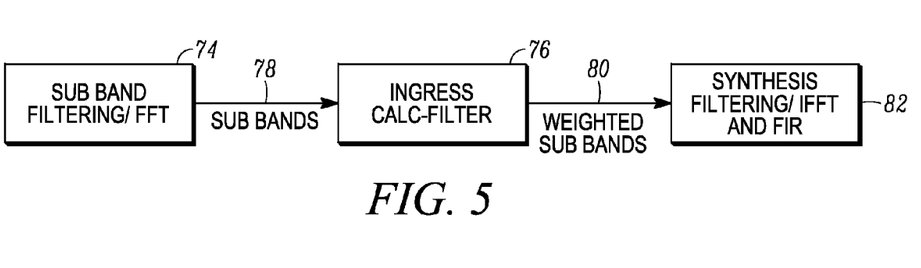
FIG. 5 is a block diagram of the overall ingress cancellation filter showing the sub band filtering/FFT circuitry, the ingress cancellation filter and the synthesis filtering/inverse FFT circuitry.

FIG. 5 is a block diagram of the overall system to cancel narrowband interference. Block 74 breaks the received signal into sub bands. This can be implemented as a bank of FIR analysis filters as in the prior art or it can be the more efficient implementation shown in FIG. 4. Block 76 is the ingress calculation filter which calculates the weighting function for each sub band received on bus 78, multiplies the samples in each sub band by the corresponding weighting factor and outputs the weighted sub band samples for each sub band on bus 80. Block 82 represents the reconstruction process where the weighted samples from each sub band are recombined into an output signal. Block 82 can be implemented with a bank of FIR synthesis filters as in the prior art or with the more efficient inverse FFT calculation circuit followed by an FIR filter to be described next.

Synthesis Filter Bank

Figure 6:
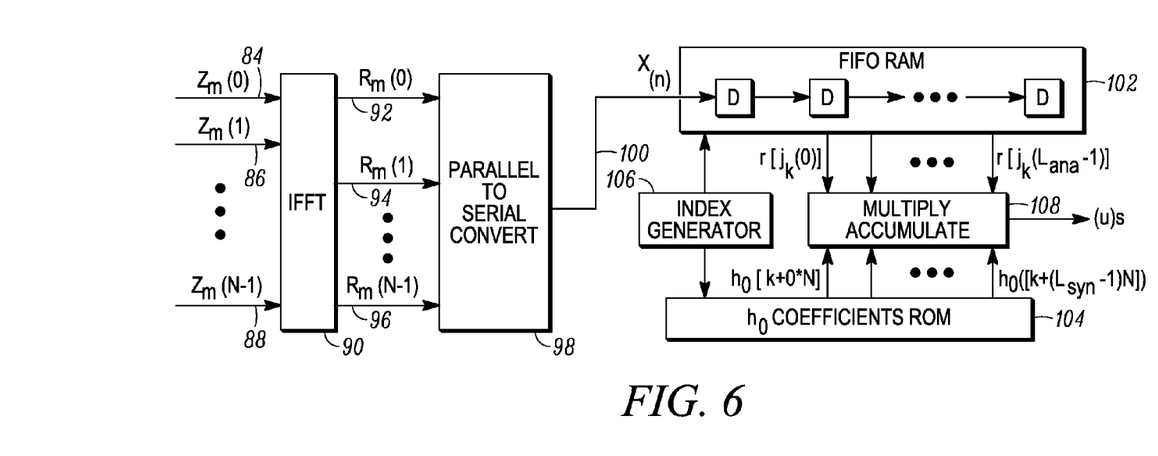
FIG. 6 is a block diagram showing a more efficient implementation of a synthesis filter bank for recombining the weighted samples for each sub band into an output signal.

The implementation of the synthesis filter bank can be represented as an inverse Fast Fourier Transform operation followed by a filtering operation. The inverse FFT operation is calculated using the weighted samples output by the ingress calculation filter FIG. 6 is a block diagram of a more efficient implementation of a synthesis filter which functions to reconstruct an output signal from the weighted sub band samples. The weighted samples of the first sub band arrive from the ICF filter on bus 84. The weighted samples from the second sub band arrive from the ICF filter on bus 86 and so on for all the sub bands with the Nth sub band samples arriving on bus 88. Block 90 performs an inverse Fast Fourier Transform on the weighted samples of each sub band and outputs a vector $R_m(k)$ of length N in parallel format on buses 92, 94 ... 96. This parallel format vector is converted to serial format by parallel to serial format converter 98. The serial stream of samples is output on bus 100 to the input of a FIFO RAM memory 102. The FIFO RAM 102 has a memory dept of N*L_syn complex number. The new sample is pushed to the head of the FIFO index (index 0 in FIFO 102), and the FIFO throws out a sample from the bottom of the FIFO (index N*L_ana−1 in FIFO 102).

A single coefficient memory bank 104 called $h_0$ of length N*L_Syn holds the coefficients that define the filter transfer function for the first sub band (the DC sub band). These coefficients are used for each sub band and define a filter transfer function which causes said filter to output samples according to the following formula.

$$s(mM+k) = \sum_{i=0}^{L\_syn-1} h_0(k+iM) * Hfifo[(m-i)*N + (k+i*N) \bmod N] \quad (5)$$

where k is the filter's index k=0, 1, ... M−1;
and $h_0$(k+iM) is the coefficient output by block 104 for each index i value;
and m counts the the IFFT output vector element number m=0, 1, 2 ... N−1);
modN is the modulo N function and the continuous index n=m*M+K.

The output samples s(n), where n=m*M+k=0, 1, 2 ... are the samples that define the reconstructed output signal from the synthesis filter after elimination of the narrowband interference components.

Therefore, the synthesis filter bank can be implemented using the following components: 1) an IFFT (block 90) which performs an inverse Fast Fourier Transform on the censoring block output; 2) a parallel to serial converter (blocks 98), converting the IFFT N length vector to serial stream; 3) a FIFO RAM of length N*L_syn (block 102); 4) a coefficient ROM (block 104) of length N*L_syn (using coefficient symmetry, the ROM can be reduced in size to N/2*L_syn; 5) and index generator (block 106) which generates indexes for the FIFO 102 and the coefficients ROM 104 according to equation (5); and a multiply and accumulate unit that multiplies the coefficients times the samples and does the summation per equation 5.

Robust Predictor Filtering Method in CDMA

In conventional TDMA systems that employ a predictor as part of the equalizer, the state of the predictor is continuous in time. This allows the filtering operation to be performed from sample to sample continuously. Referring to FIG. 14 in the prior art U.S. Pat. No. 6,426,983 a predictor block diagram is taught. The general idea of a predictor circuit is to use a plurality of prior samples to predict the noise present in the next sample to be received and to generate a signal which, when subtracted from the next sample received, causes the resulting sample input to the slicer to be noise free or at least not have as much noise. In the prior art circuit of FIG. 14, filter 220 is the predictor filter and is a conventional FIR with a FIFO which stores a string of samples which arrive on line 228. The coefficients on line 242 are continually adapted to adjust the filter characteristics. The sample containing only the predicted noise in the prior art design is output on line 222 and is subtracted in subtractor 224 to remove the noise on the sample on line 220 before slicer 204 processes it to make a decision. The problem with the prior art predictor filter is that although it works in TDMA systems, it does not work in CDMA systems because the samples in the FIFO of the predictor filter need to be limited to samples from one sampling interval to predict the noise in samples from that same sampling interval and they are not so limited.

The invention is to improve upon that situation so that the predictor can work in CDMA systems. The problem is to predict the noise in the first samples of the spreading interval using only prior samples from the same spreading interval. This is difficult to do since there are no previous samples from the spreading interval when making a prediction on the first sample in the spreading interval. The trick the invention employs to solve this problem is to initialize the FIFO of the predictor filter at the beginning of each spreading interval with samples based upon the unused codes of that spreading interval. In CDMA and SCDMA DOCSIS systems there are unused codes in every spreading interval. By custom, the unused codes in a spreading interval are the first codes in the code book. Since there is no data transmitted on the unused codes, any non zero samples received on an unused code is purely noise from the channel. These "noise samples" received on the unused codes are used to initialize the contents of the predictor FIR filter FIFO at the beginning of each spreading interval.

Now for the details. The predictor circuit of the invention functions to perform the same purpose as the predictor filter of FIG. 14 in the prior art Pat. No. 6,426,983. The predictor filter of the invention is an adaptive FIR filter which functions to reduce any residual narrowband interference which is left after the ICF block (ingress cancellation filter) performs its narrowband interference cancellation function. The predictor block uses symbol decisions from the slicer to remove correlated (colored) noise in the slicer input. The predictor in code division multiple access (CDMA) systems operates after the despreader (in the code domain).

In the prior art predictor circuit of FIG. 14 of U.S. Pat. No. 6,426,983, included here as FIG. 7 marked prior art, the input samples on line 228 to the predictor filter 230 are continuous in time. The state of the predictor is composed of the last L consecutive input samples from line 228 which are stored in the FIR buffer memory. When processing a new sample, the state can be updated from the previous period of time to the next period continuously by simply throwing away the oldest sample in the memory and storing the new sample.

As noted earlier, when using the predictor in CDMA system, the predictor operates in the code domain, i.e., after the de-spreading operation. In such a system, there is a problem of discontinuity between consecutive spreading intervals. The input samples in the FIR FIFO of the predictor cannot be continuously processed from one spreading interval to the preceeding spreading interval as that causes the predictor to not work properly. It is important that the predictor filter FIFO have only samples stored therein from the current spreading interval for which it is attempting to predict noise from the states of previous samples within the same spreading interval.

Figure 7:
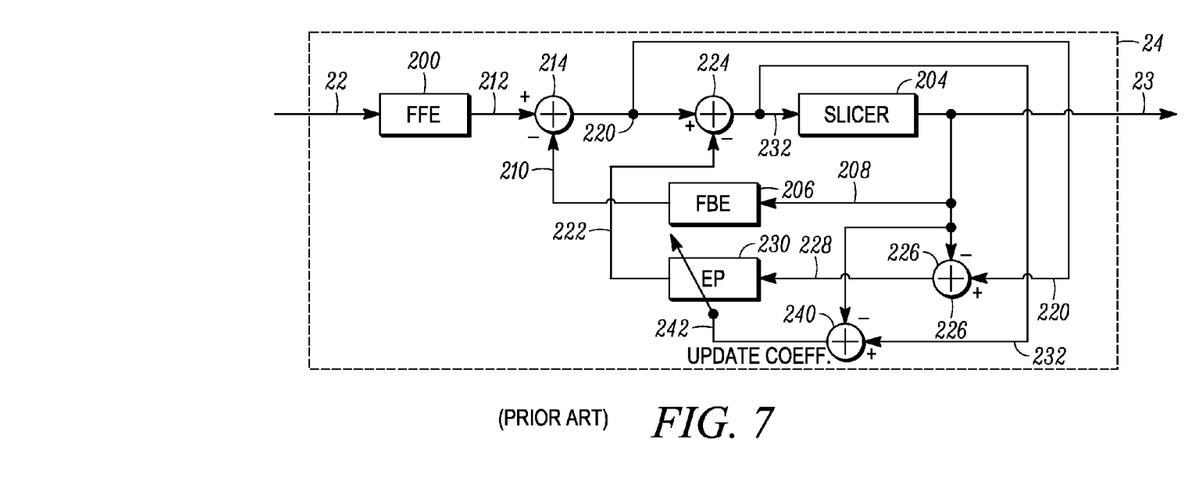
FIG. 7 is a block diagram of a prior art predictor filter implementation.

More specifically, the state of the FIR in the CDMA system predictor is comprised of L consecutive samples on line 228 in FIG. 7 corresponding to L sequential code locations. Looking at the signal content of samples on line 228, it is composed of the slicer input minus the slicer decisions. The slicer input on line 220 in FIG. 7 is composed of the demodulated symbols plus the channel interference, e.g., the ingress noise, projected into the code domain by the despreading operation. Thus, assuming a correct slicer decision, the transmitted signal is on line 23, so the signal on line 228 in FIG. 7 contains only channel interference projected onto the L current codes. This is because subtractor 226 subtracts the transmitted signal from the received signal (the transmitted signal plus noise projected into the code domain) and outputs the result on line 228.

When processing the next sample in the next code location, the state of the predictor FIR is updated by throwing away the sample of the code with the further index from the current index in the memory and storing the new sample.

When the FIR has finished filtering the samples up to the last code in the spreading interval, the next sample to be processed corresponds to the first code in the next spreading interval. However, because of the spreading operation, there is a discontinuity of state between the the last code of the spreading interval just processed in the predictor FIR and the first code of the next spreading interval to be processed by the FIR. By discontinuity, we mean the correlation relationship between the L last samples and the new sample inside a spreading interval, which is represented by the FIR coefficients, is not maintained when considering the last L samples in a spreading interval and the first sample belonging to the next spreading interval.

The invention provides the following solution to this discontinuity problem. The first L codes in each spreading interval will not carry any transmitted payload symbols as there are unused codes in every DOCSIS SCDMA spreading interval and may well be unused codes in other CDMA spreading intervals as well. Both the transmitter and the receiver recognize these unused codes in the DOCSIS protocol and any other protocol of a CDMA system since the transmitter and receiver in CDMA systems always must know which codes are being used. The transmitter would not assign symbols to these unused codes before spreading the data. At the receiver, the content of these unused codes is attributable purely to the projection of channel interference, e.g., ingress noise, onto these unused codes. Thus, the content of these L samples corresponding to the first L unused codes of each spreading interval represents the desired state needed to predict the noise content of the next sample (comprising payload data plus ingress noise and corresponding to code index L+1).

Figure 8A:
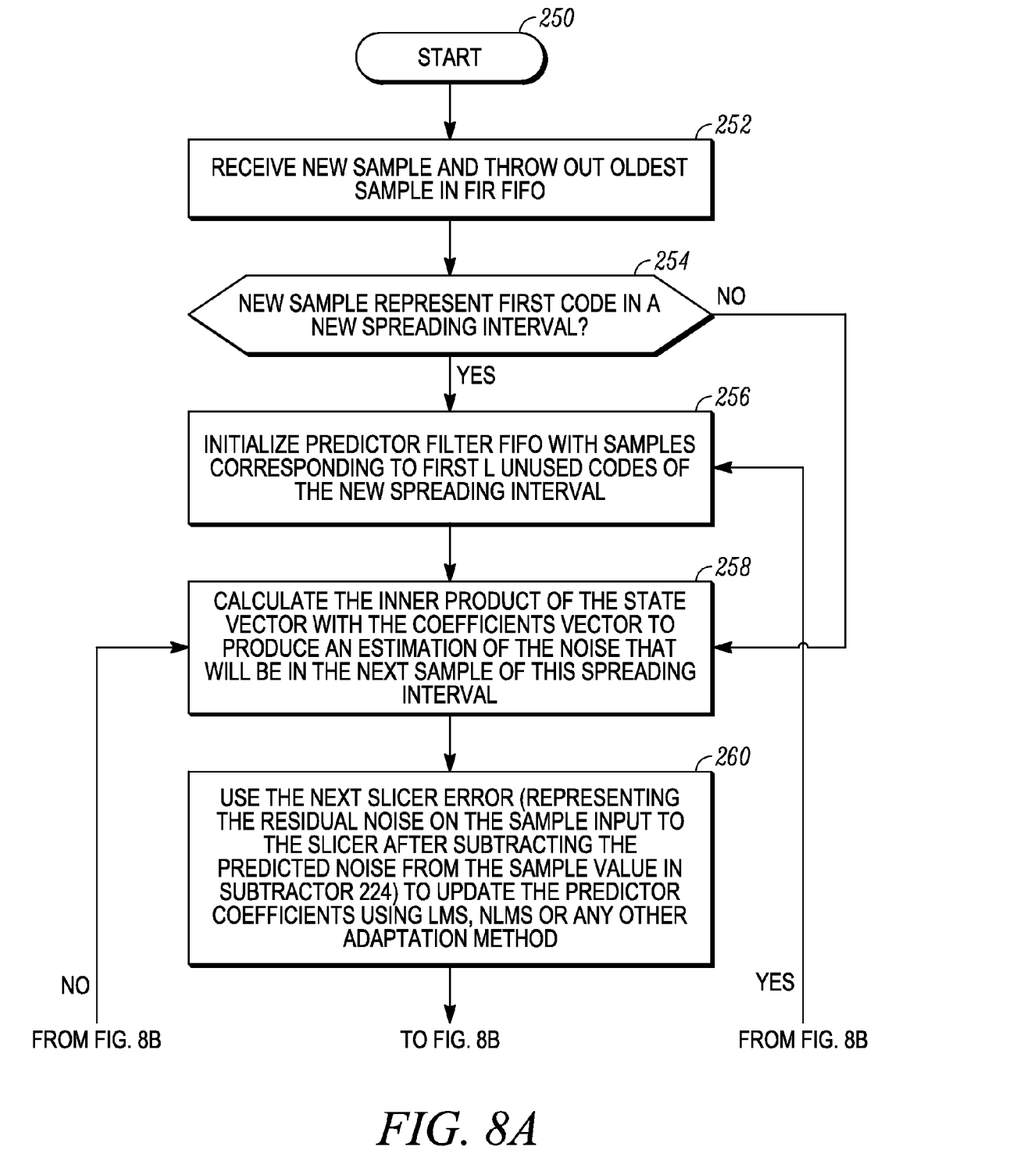
FIG. 8 is a flow chart of the operation of a predictor according to the invention.
Figure 8B:
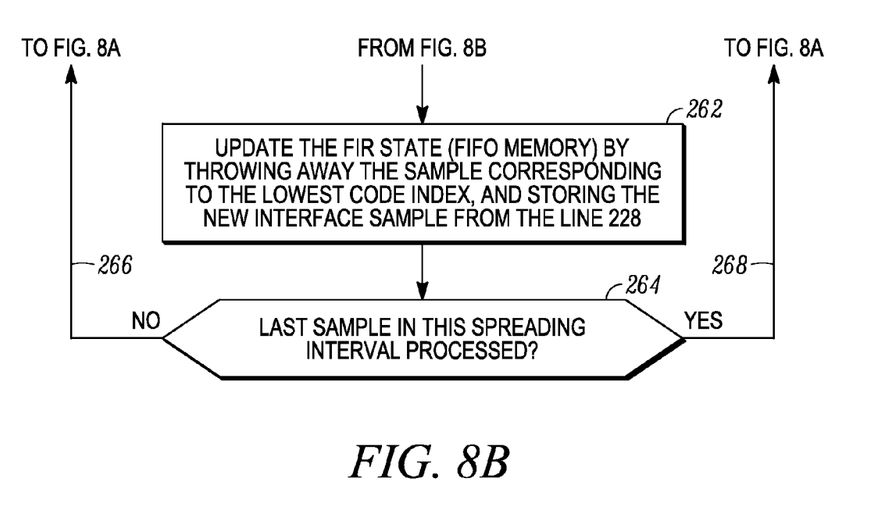

Therefore, the predictor of the invention operates in a CDMA system in the following fashion, as illustrated by the flowchart of FIGS. 8A and 8B. The process starts at step 250 and then proceeds to step 252 where a new sample is received and is stored in the FIR FIFO. Test 254 is then performed to determine if the new sample represents what was received on the first code of a new spreading interval. If not, processing proceeds to step 258 to be described below. If the new sample represents the first code in a new spreading interval, step 256 is performed to initialize the predictor filter FIFO with samples corresponding to the first L unused codes of the new spreading interval. This is the key to making the prior art predictor filter work properly in a CDMA system.

Next, step 260 is performed to adapt the predictor filter coefficients. Specifically, step 258 results in a prediction by the prediction filter 230 in FIG. 7 as to what the noise will be added to the payload data on the first sample transmitted on the first code that was used to transmit payload data in the new spreading interval. This prediction is output on line 222 and is subtracted by subtractor 224 from the FFE filtered received sample on line 220. Theoretically, the output sample on line 232 should be noise free, but in the real world it often is not noise free. This results in the slicer 204 outputting the transmitted symbo on line 23 which differs from the symbol on line 232 which was input to the slicer. Subtractor 240 compares these two values and outputs the difference on line 242 which is used to adapt the predictor filter coefficients to attempt to reduce the error. Any least means squared, NLMS or other adaptation method may be used to adapt the predictor filter coefficients.

In step 262, the predictor FIR filter state is updated by throwing away the the sample corresponding to the lowest code index, and storing the newest interference sample on line 228 in the FIFO. Test 264 is then performed to determine if the sample just stored represents the last sample in the current spreading interval. If not, processing proceeds on line 266 back to step 258. If the sample just stored in the last sample in the current spreading interval, processing proceeds on line 268 back to step 256 to re-initialize the FIR filter FIFO with samples corresponding to the first L unused codes of the new spreading interval.

Figure 9:
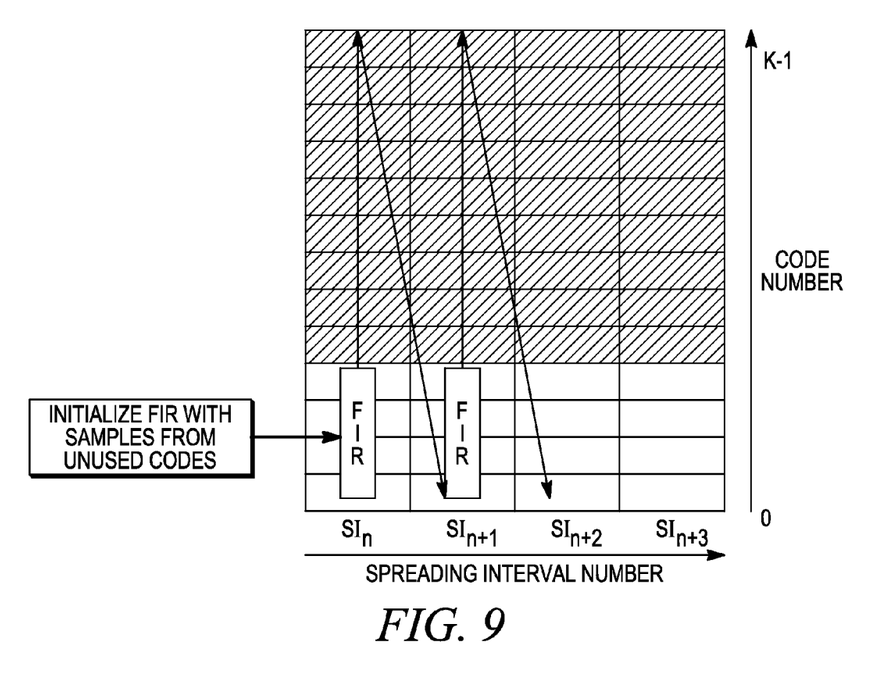
FIG. 9 is a diagram symbolizing the initialization of the predictor filter FIFO at the beginning of each new spreading interval.

FIG. 9 represents the predictor filter initialization process graphically. The actual circuitry of the predictor filter of the invention is as shown in FIG. 7 modified by a microprocessor that runs the process of FIG. 8 to re-initialize the FIR filter 230 FIFO coefficients with samples received on the first L unused codes of the new spreading interval. Thereafter, during any particular spreading interval, the circuit of FIG. 7 works as shown. Therefore, the modifications to FIG. 7 needed to adapt it to the teachings of the invention would, in one embodiment to make line 228 the output of a two input multiplexer with one input coupled to receive the output of subtractor 226 and the other input coupled to the microprocessor to receive the samples received on the first L unused codes of each new spreading interval with the microprocessor keeping track of which code in each spreading interval each sample represents and controlling the switching of the multiplexer.

Although the invention has been disclosed in terms of the preferred and alternative embodiments disclosed herein, those skilled in the art will appreciate that modifications and improvements may be made without departing from the scope of the invention. All such modifications are intended to be included within the scope of the claims appended hereto.

What is claimed is:

1. A method for weighting samples in a sub band of frequencies in a narrowband excision system for transmissions from a plurality of cable modems in a DOCSIS compatible digital data transmission system to a cable modem termination system, comprising the steps:
   1) decomposing the signal received over a hybrid fiber coaxial cable system from a cable modem into a plurality of sub bands using a bank of analysis filters or a fast fourier transform calculation circuit;
   2) estimating the transmitted signal power in each of a plurality of sub bands of the transmitted signal from the cable modem whose transmissions are being processed;
   3) calculating the average received signal power in each sub band of the signal received at said cable modem termination system from the cable modem;
   4) for each said sub band, divide the estimated transmitted signal power in said sub band calculated in step 2 by the average received signal power calculated in step 3 to derive the weighting factor for each sub band, wherein deriving the weighting factor comprises calculating a running average of the product of each sample's complex number times its conjugate; and
   5) multiply the samples in each sub band by the weighting factor calculated in step 4 for said sub band,
   wherein step 2 is done for each sub band in the transmission from the cable modem by performing the following steps:
   A) averaging the received signal power in each sub band;
   B) computing the sum of the power of all N sub bands;
   C) subtracting the sum of the power of a predetermined number L of the strongest sub bands from the total power calculated in step B;
   D) scale the total power calculated by step C by the factor N/(N-L) so as to account for the signal lost by eliminating the signal power of said L strongest sub bands to derive a new total power; and
   E) for each sub band, scale the new total power by a predetermined factor corresponding to the spectral power of the transmit filter in the Kth sub band to derive the transmitted signal power in the Kth sub band.

2. The process of claim 1 wherein step 1 is done using a bank of analysis filters.

3. The process of claim 1 wherein step 1 is done using a finite impulse response filter feeding the inputs of a Fast Fourier Transform calculation circuit.

4. The process of claim 1 wherein step 3 comprises calculating the average signal power of the signal output from each analysis filter.

5. The process of claim 1 wherein step 3 comprises calculating the average power of the signal defined by the samples output in each bin output by a Fast Fourier Transform calculation circuit.

6. The process of claim 1 further comprising the step of recombining the weighted samples calculated step 5 to generate a narrowband interference excised output signal.

7. The process of claim 1 wherein step 2 is done for each sub band in the transmission from a cable modem using data transmitted from said cable modem termination system to said cable modem which sets its transmit power.

8. The process of claim 1 wherein step 2 is done as a continuous operation so as to adaptively track variation in received signal power.

* * * * *